(12) United States Patent
Crowley et al.

(10) Patent No.: US 8,910,954 B2
(45) Date of Patent: Dec. 16, 2014

(54) KING-PIN HEIGHT ADJUSTER

(75) Inventors: Mark Crowley, Spirit Lake, IA (US); Nathan Low, Windom, MN (US); John Buschena, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 438 days.

(21) Appl. No.: 13/324,355

(22) Filed: Dec. 13, 2011

(65) Prior Publication Data

US 2012/0175852 A1 Jul. 12, 2012

Related U.S. Application Data

(60) Provisional application No. 61/422,773, filed on Dec. 14, 2010.

(51) Int. Cl.
*B62D 33/08* (2006.01)
*B62M 7/14* (2006.01)
*B60G 3/01* (2006.01)

(52) U.S. Cl.
CPC .......... *B60G 3/01* (2013.01); *B60G 2204/4232* (2013.01); *B60G 2300/08* (2013.01)
USPC ........................................ 280/43.17; 180/13

(58) Field of Classification Search
CPC ............ B60S 9/215; B60S 13/00; B60S 9/10; B62D 59/04; B62D 47/006; B62D 51/005; B62D 49/065; B62D 49/00; B62D 49/0664; B62D 51/04; B62D 51/06; B62D 53/02; B62D 53/021; B62D 53/0864; B62D 5/0418; B62D 61/08; B62D 61/10; B62D 12/00; B62D 12/02; B62D 1/14; B62D 37/00; B62D 49/005; B62D 49/007; B62D 49/02; B62D 49/04; B62D 49/0621; B62D 49/0642; B62D 49/0657; B62D 49/0678; B62D 51/001; B62D 51/02; B62D 53/00; A61G 7/012; A61G 2203/72; A61G 2005/1051; A61G 5/047; A61G 2220/145; A61G 2203/14; A61G 3/0808; A61G 5/02; A61G 5/042; A61G 12/00; A61G 12/001; A61G 1/0225; A61G 1/0243; A61G 1/0268; A61G 1/0275; A61G 1/0287; A61G 2203/80; A61G 2210/30; A61G 3/06; A61G 3/061; A61G 5/023; A61G 5/026; A61G 5/027; A61G 5/046; A61G 7/0015; A61G 7/002; A61G 7/005; A61G 7/008; A61G 7/015; A61G 7/02; A61G 7/05; A61G 7/0507; A61G 7/053; A61G 1/00
USPC ............. 280/5.3, 6.15, 43, 43.17, 762, 763.1, 280/764.1, 765.1, 767, 124.157, 124.158; 180/11, 12, 13, 16, 232, 233
See application file for complete search history.

(56) References Cited

U.S. PATENT DOCUMENTS

| | | | | |
|---|---|---|---|---|
| 2,220,254 | A | * | 11/1940 | Maier ...................... 280/86.751 |
| 2,372,657 | A | * | 4/1945 | Sida .............................. 180/200 |
| 3,067,831 | A | * | 12/1962 | Willock ........................ 180/308 |
| 3,160,223 | A | * | 12/1964 | Kumferman .................. 180/306 |

(Continued)

*Primary Examiner* — J. Allen Shriver, II
*Assistant Examiner* — Bridget Avery

(57) ABSTRACT

A height adjuster may be provided. The height adjuster may comprise a hydraulic lift cylinder and a ram configured to receive the hydraulic lift cylinder. The height adjuster may further comprise a wheel motor housing connected to a lower end of the ram. A lower end of the hydraulic lift cylinder may be connected to the wheel housing. In addition, the height adjuster may comprise a king-pin configured to receive the ram.

1 Claim, 6 Drawing Sheets

(56) References Cited

U.S. PATENT DOCUMENTS

| | | | | |
|---|---|---|---|---|
| 3,163,250 A | * | 12/1964 | Gibson | 180/253 |
| 3,250,340 A | * | 5/1966 | Roberson | 180/242 |
| 3,306,390 A | * | 2/1967 | Georges | 180/209 |
| 3,387,681 A | * | 6/1968 | Rabjohn | 180/13 |
| 3,550,992 A | * | 12/1970 | Grancon | 280/6.157 |
| 3,783,960 A | * | 1/1974 | Feliz | 180/14.2 |
| 3,861,482 A | * | 1/1975 | Stephens et al. | 180/13 |
| 3,972,379 A | * | 8/1976 | Norris | 180/234 |
| 4,662,476 A | * | 5/1987 | Ross | 182/13 |
| 4,860,841 A | * | 8/1989 | Sacco | 180/13 |
| 5,154,437 A | * | 10/1992 | Inagaki et al. | 180/411 |
| 6,779,616 B1 | * | 8/2004 | Brown | 180/13 |
| 6,945,343 B1 | * | 9/2005 | Moreau et al. | 180/13 |
| 7,328,761 B1 | * | 2/2008 | Tyler | 180/13 |
| 7,621,356 B2 | * | 11/2009 | Quarberg | 180/12 |
| 7,922,181 B2 | * | 4/2011 | Hakui et al. | 280/6.157 |
| 8,029,413 B2 | * | 10/2011 | Law et al. | 482/27 |
| 2006/0042841 A1 | * | 3/2006 | Russell | 180/13 |
| 2007/0152425 A1 | * | 7/2007 | Richards | 280/476.1 |

* cited by examiner

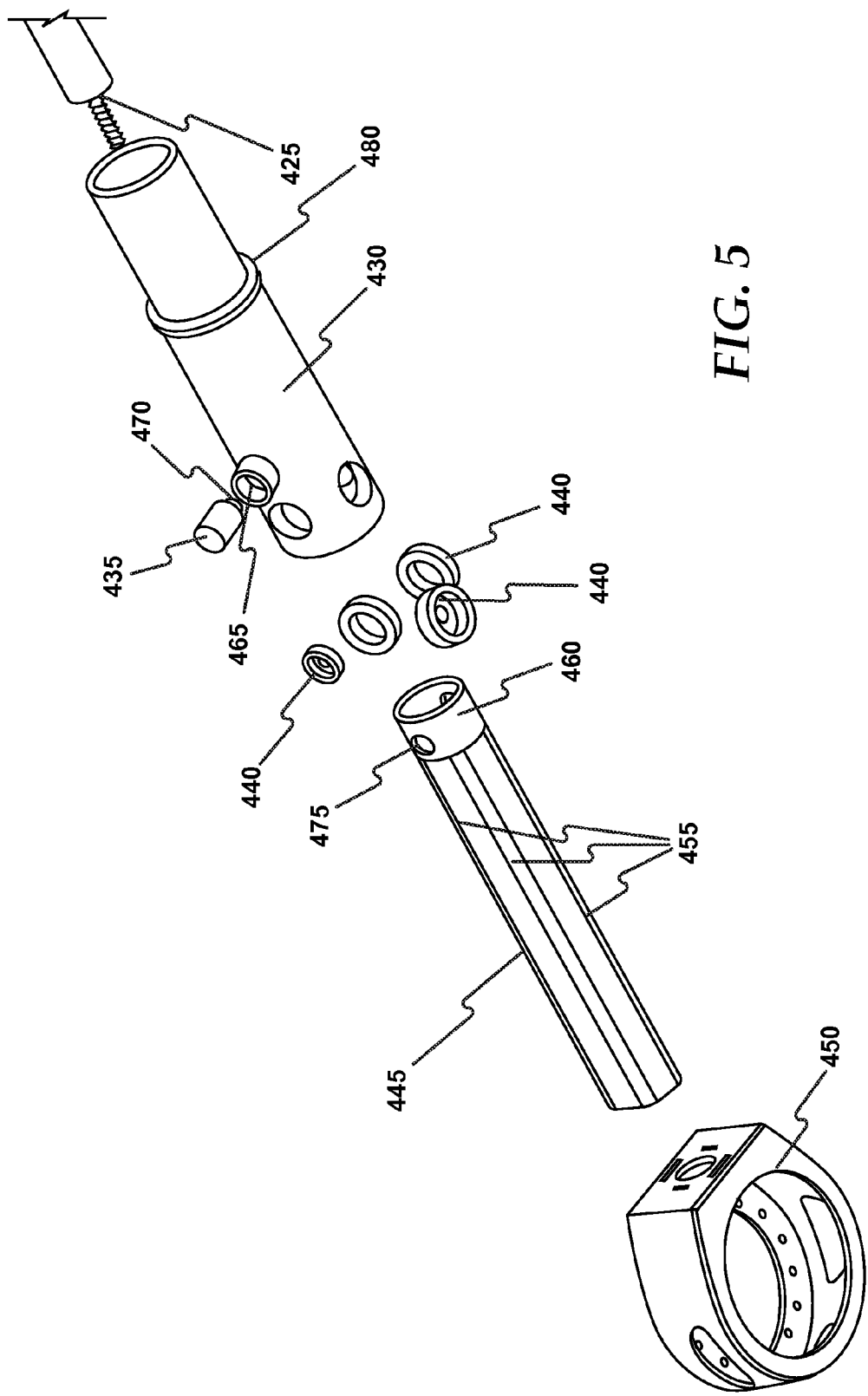

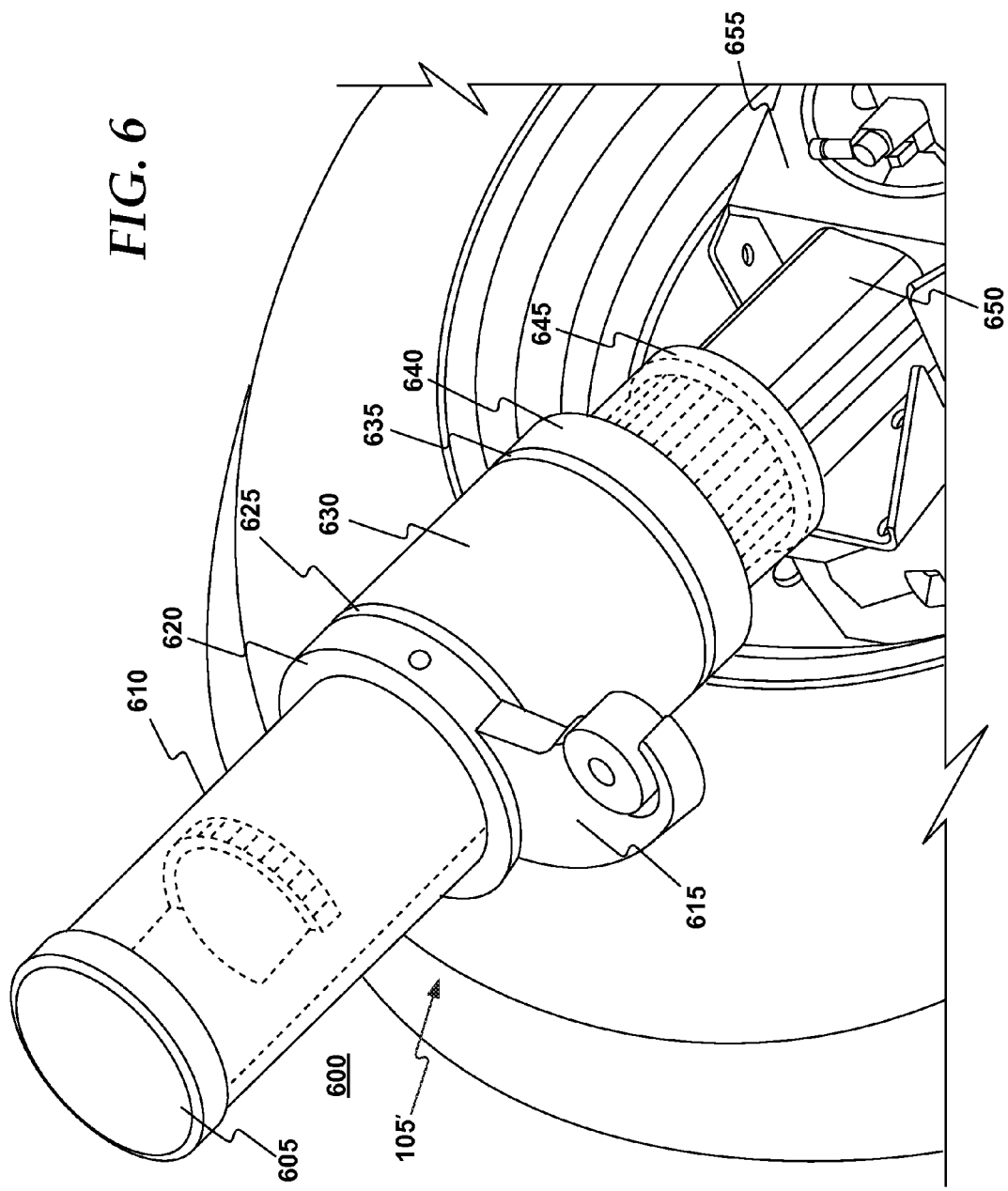

KING-PIN HEIGHT ADJUSTER

RELATED APPLICATION

Under provisions of 35 U.S.C. §119(e), Applicants claim the benefit of U.S. Provisional Application No. 61/422,773 filed Dec. 14, 2010, which is incorporated herein by reference.

BACKGROUND

A tractor is a vehicle designed to deliver a high torque at slow speeds for hauling a trailer or machinery used in agriculture or construction. "Tractor" is most commonly used to describe a farm vehicle. Agricultural implements may be towed behind or mounted on the tractor, and the tractor may also provide a source of power if the implement is mechanized.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A height adjuster may be provided. The height adjuster may comprise a hydraulic lift cylinder and a ram configured to receive the hydraulic lift cylinder. The height adjuster may further comprise a wheel motor housing connected to a lower end of the ram. A lower end of the hydraulic lift cylinder may be connected to the wheel housing. In addition, the height adjuster may comprise a king-pin configured to receive the ram.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIG. 5 shows a king-pin structure; and

FIG. 6 shows another embodiment of the invention.

DETAILED DESCRIPTION

Figure 1:
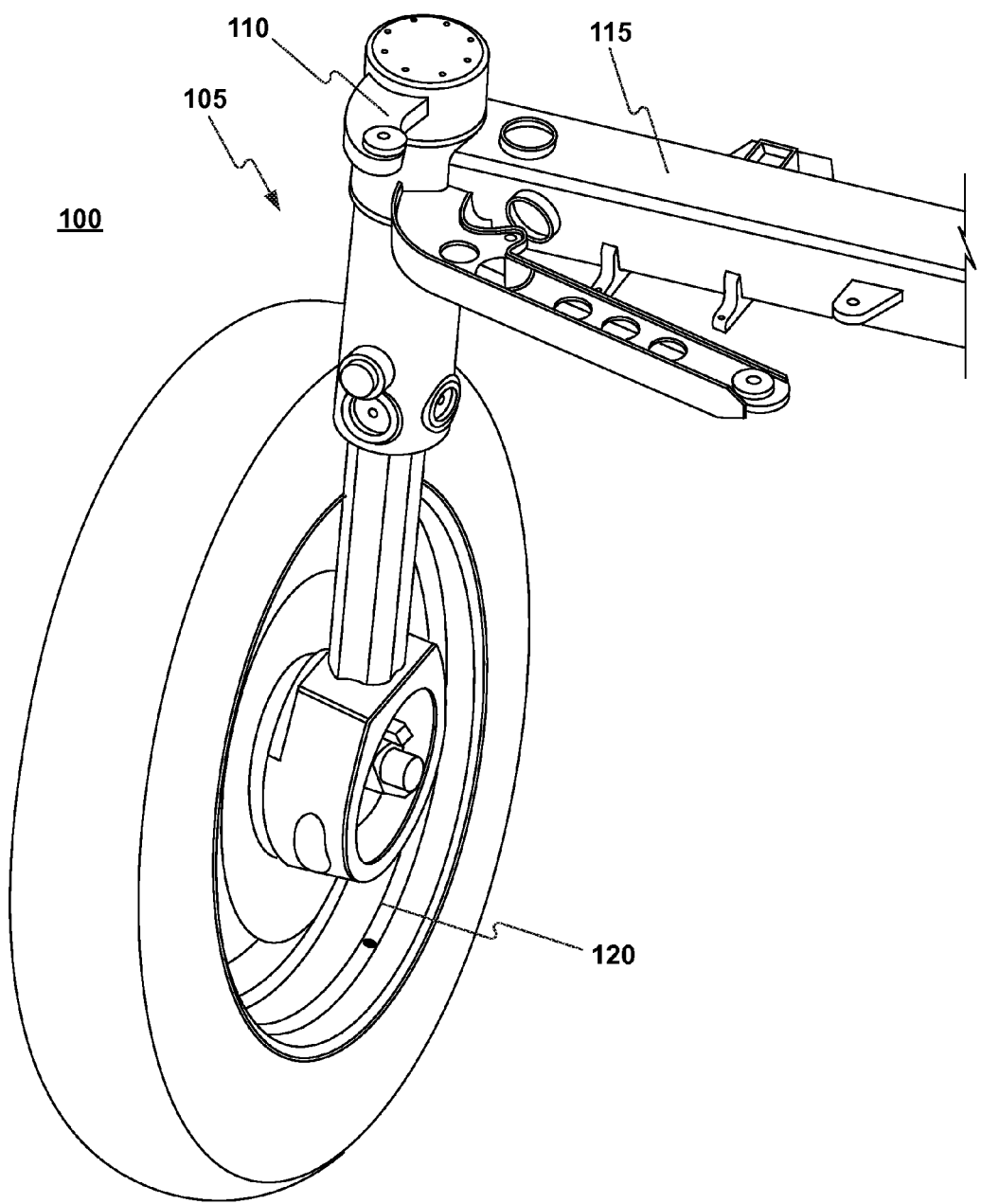
FIG. 1 shows a king-pin height adjuster system.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Consistent with embodiments of the invention, a king-pin height adjuster may be provided. When utilized in an agricultural vehicle, for example, embodiments of the invention may allow for more crop clearance than conventional agricultural vehicles. In addition, embodiments of the invention may allow for standard machine track width adjustment as will be described in greater detail below.

Figure 2A:
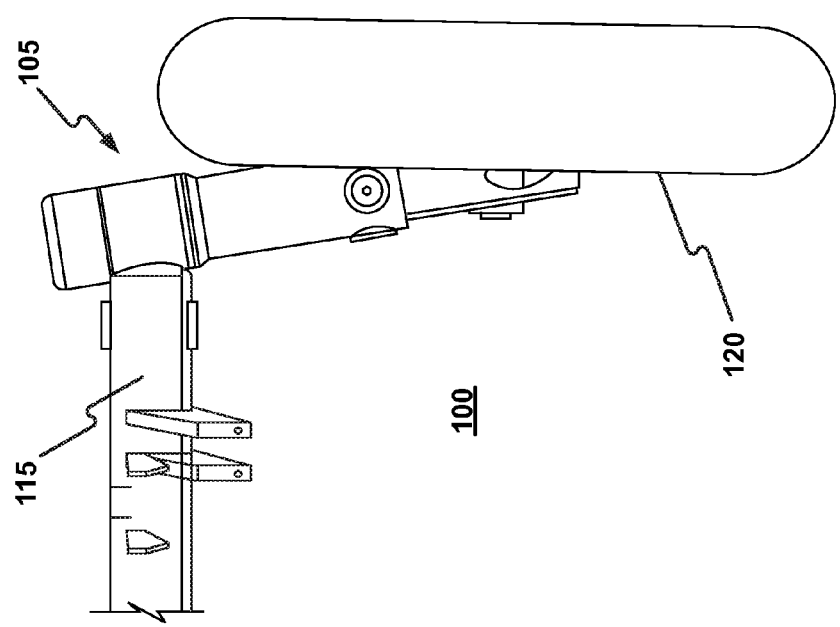
FIGS. 2A and 2B show a king-pin height adjuster system.
Figure 2B:
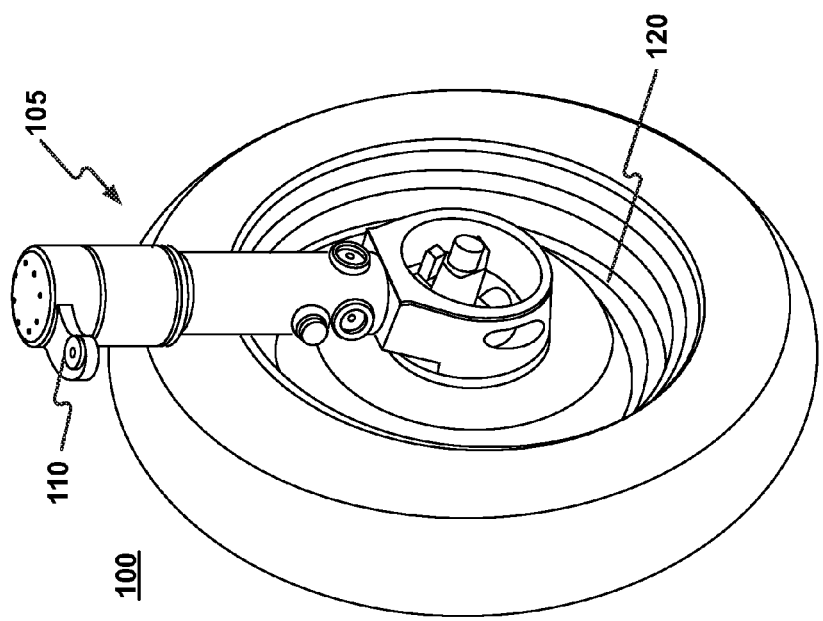
Figure 3B:
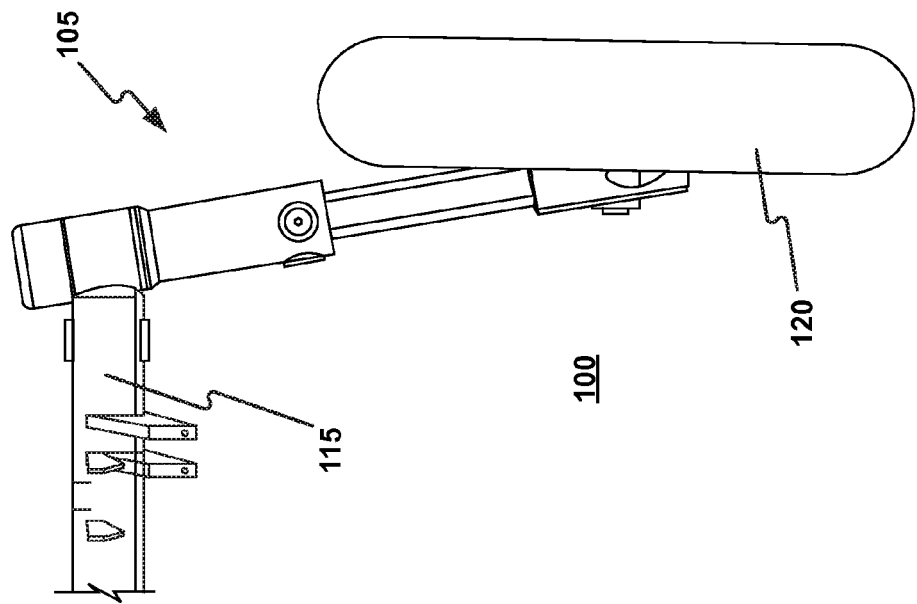
FIGS. 3A and 3B show a king-pin height adjuster system.
Figure 3A:
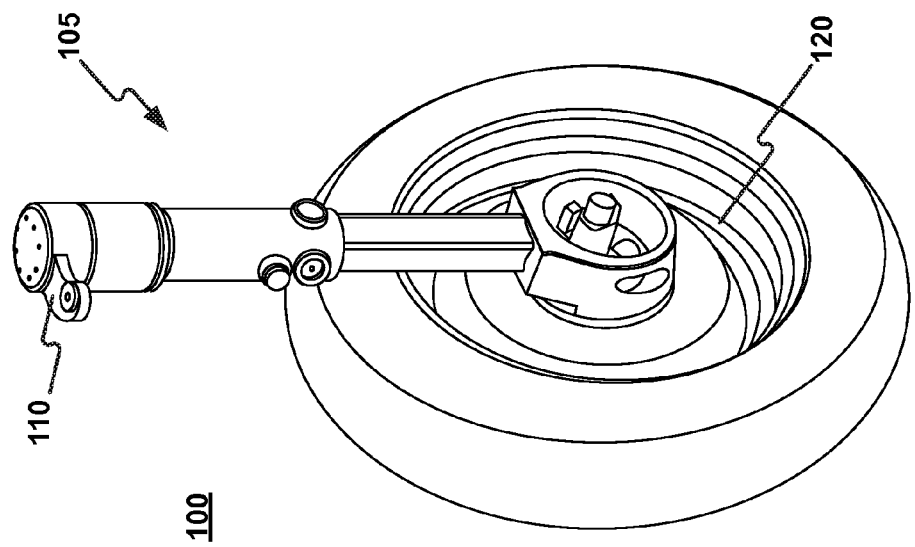

FIG. 1 shows a king-pin height adjuster system 100. As shown in FIG. 1, system 100 may comprise a king-pin structure 105 that may include a steering arm 110. System 100 may further comprise and an axel 115 and a wheel assembly 120. Axel 115 may connect to a vehicle. Embodiments of the invention may utilize hydraulics inside king-pin structure 105, for example, to increase off-road vehicle clearance. For example, FIG. 2A and FIG. 2B show system 100 where hydraulics inside king-pin structure 105 are in a retracted position. FIG. 3A and FIG. 3B, however, show system 100 where hydraulics inside king-pin structure 105 are in an extended position that may increase off-road vehicle clearance for a vehicle using king-pin structure 105.

Figure 4:
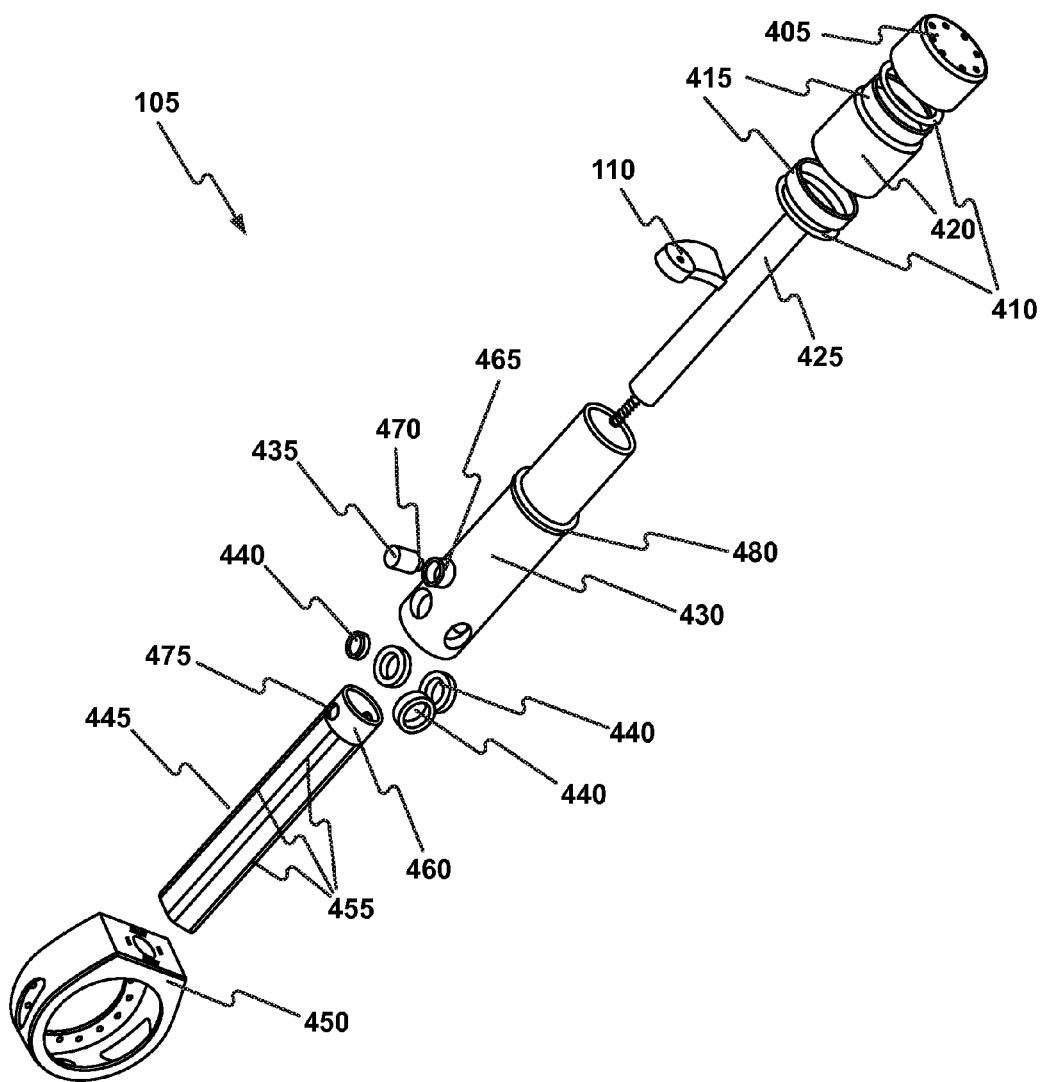
FIG. 4 shows a king-pin structure.

FIG. 4 shows king-pin structure 105 in greater detail. As shown in FIG. 4, king-pin structure 105 may comprise a cap 405, thrust bearings 410, king-pin bearings 415, and a king-pin bearing housing 420. Steering arm 110 may be connected to cap 405. King-pin bearing housing 420 may connect to axel 115. King-pin structure 105 may further comprise a hydraulic lift cylinder 425. Moreover, king-pin structure 105 may comprise a king-pin 430 that may receive a locking cylinder 435 and adjustable retention pucks 440. As shown in FIG. 4, king-pin 430 may receive hydraulic lift cylinder 425 at an upper end of king-pin 430. King-pin structure 105 may further comprise a ram 445 that may connect to a wheel motor housing 450. King-pin 430 may receive ram 445 at a lower end of king-pin 430. Wheel motor housing 450 may connect to wheel assembly 120. FIG. 5 shows a lower portion of king-pin structure 105 in greater detail.

Consistent with embodiments of the invention, hydraulic lift cylinder 425 may be received in king-pin structure 105 and may extend or retract ram 445 connected to wheel motor assembly 120. This may allow a vehicle connected to axel 115 to be raised or lowered. King-pin 430 may rotate when steering forces act on it. A portion of king-pin 430 (e.g. between an upper end of king-pin 430 and a lip 480 of king-pin 430) may mount inside king-pin bearing housing 420. King-pin bearing housing 420 may be connected to a chassis tracking system. The chassis tracking system may be used to keep a wheel track width for the vehicle constant as the wheels are moved down and away from the center of the vehicle. A hydraulic circuit and a mechanical device may lock the wheel into position.

King-pin bearing housing 420 may contain bearings (e.g. king-pin bearings 415) that constrain the king-pin radially. This may allow king-pin 430 to rotate enabling steering forces applied to steering arm 110 to be transferred. Cap 405 and thrust bearings 410 may constrain king-pin 430 axially. Cap 405 may bolt into the top of king-pin 430 and may compresses thrust bearings 410, king-pin bearing housing 420, and king-pin 430 together at lip 480 on king-pin 430. Cap 405 may also support hydraulic lift cylinder 425 at a top end of hydraulic lift cylinder 425. King-pin bearing housing 420 may be welded to axel 115. King-pin 430 may rotates inside king-pin bearing housing 420 transferring steering forces from steering arm 110 to ram 445 and ultimately to wheel assembly 120.

Being hollow, king-pin 430 may constrain ram 445 to only axial motion though the use of adjustable retention pucks 440 for example. Adjustable retention pucks 440 may be inserted and assembled into king-pin 430. Adjustable retention pucks 440 may adjust by being screwed in or out until they make contact with ram 445's flat surfaces 455. Moreover, adjustable retention pucks 440 may provide a wear surface and retain ram 445 by preventing rotation of ram 445 while allowing ram 445 to slide axially up and down inside king-pin 430.

Ram 445 may move axially inside king-pin 430 and may connect king-pin 430 to wheel motor housing 450. An upper part 460 of ram 445 may have a cylindrical surface ram 445 that may remain inside king-pin 430. Flat surfaces 455 may extend from upper part 460 and provide surfaces for adjustable retention pucks 440 to engage. Flat surfaces 455, in conjunction with adjustable retention pucks 440, may constrain ram 445 from rotating. King-pin 430's hollow center may allow hydraulic lift cylinder 425's shaft to pass through and connect to wheel motor housing 450.

Locking cylinder 435 may be disposed within a cylinder housing 465 on a side of king-pin 430. Locking cylinder 435 may have a pneumatically actuated rod 470. When locking cylinder 435's rod 470 is extended, rod 470 may engage a hole 475 in ram 445 and may prevent ram 445 from moving axially up or down. Locking cylinder 435 may lock ram 445 in place once rod 470 reaches its extended position. Locking cylinder 435 can drive rod 470 pneumatically or by hydraulics. Moreover, locking cylinder 435 may be spring loaded so that it may extend in a no power state and may retract when power is applied. This may ensure that the locking cylinder 435 will engage and stay engaged to lock ram 445 if power is lost or if the vehicle is turned off.

Hydraulic lift cylinder 425 may connect to cap 405 at an upper end of hydraulic lift cylinder 425 and may connect to wheel motor housing 450 on a lower end of hydraulic lift cylinder 425. A common hydraulic circuit may allow hydraulic lift cylinder 425 to extend or retract. This action by hydraulic lift cylinder 425 may supply the power to move the vehicle up or down. A hydraulic lock within the hydraulic circuit may prevent ram 445 from extending or retracting once it is in a desired state. This hydraulic lock may be in addition to the before mentioned mechanical lock provided by locking cylinder 435.

FIG. 6 shows another embodiment of the invention. As shown in FIG. 6, a system 600 may comprise a structure 105'. Structure 105' may be similar to king-pin structure 105 described above and may be used in place of king-pin structure 105 in system 100. As compared to king-pin structure 105, in structure 105', hydraulic lift cylinder 425 may be eliminated. Instead, an internal hydraulic cylinder may be used and the entire kingpin may be pressurized, turning the kingpin into a cylinder. The ram may be keyed with a half-moon insert, for example. This may keep the ram from rotating under steering forces. While a half-moon may be used, the shape is not limited to half-moon and other shapes may be used.

As shown in FIG. 6. structure 105' may comprise a cap 605, a cylinder 610, a steering arm 615, a steering arm collar 620, a first thrust bearing 625, a bearing housing 630, a second thrust bearing 635, a flange 640, a cylinder seal 645, a ram 650, and a wheel motor housing 655. Ram 650 may move axially inside cylinder 610. A lower end of ram 650 may connect to wheel motor housing 655. Ram 650 may be keyed with a half-moon insert, for example, that may mate with an inside surface of cylinder 610. This keying may keep ram 650 from rotating inside cylinder 610 under steering forces placed on cylinder 610 by steering arm 615.

The inside of cylinder 610 may be pressurized and sealed (using cylinder seal 645.) Ram 650 may move axially up and down inside cylinder 610 in response to hydraulic fluid pressure inside cylinder 610. Internal bearings or bushing may be disposed between cylinder 610 and ram 650.

Bearing housing 630 may contain bearings that may constrain cylinder 610 radially. This may allow cylinder 610 to rotate in bearing housing 630 enabling steering forces applied to steering arm 615 to be transferred to cylinder 610. Cap 605 may bolt into the top of cylinder 610. Steering arm collar 620 and flange 640 may compress first thrust bearings 625, bearing housing 630, and second thrust bearings 635 together. Bearing housing 630 may be welded to axel 115. Cylinder 610 may rotate inside bearing housing 630 transferring steering forces from steering arm 615 to ram 650 and ultimately to wheel motor housing 655.

While certain embodiments of the invention have been described, other embodiments may exist. Further, any disclosed methods' stages may be modified in any manner, including by reordering stages and/or inserting or deleting stages, without departing from the invention. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A height adjuster comprising:
   a ram;
   a wheel motor housing connected to a lower end of the ram;
   a cylinder configured to receive the ram, the ram configured to slide axially inside the cylinder in response to hydraulic pressure created inside the cylinder;
   a bearing housing, a portion of the cylinder being mounted inside the bearing housing;
   king-pin bearings being between the cylinder and the bearing housing;
   a cap connected to a top end of the cylinder;
   first thrust bearings between an arm collar connected to the cylinder and the bearing housing; and
   second thrust bearings between the bearing housing and a flange connected to the cylinder, wherein the portion of the cylinder is configured to rotate inside the bearing housing in response to steering forces placed on a steering arm connected to the arm collar.

* * * * *